United States Patent
Takahashi

(10) Patent No.: US 11,141,932 B2
(45) Date of Patent: Oct. 12, 2021

(54) FORMABLE RESIN SHEET, PRODUCTION METHOD FOR FORMABLE RESIN SHEET, SHAPED OBJECT AND PRODUCTION METHOD FOR SHAPED OBJECT

(71) Applicant: Casio Computer Co., Ltd., Tokyo (JP)

(72) Inventor: Hideki Takahashi, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 54 days.

(21) Appl. No.: 16/526,220

(22) Filed: Jul. 30, 2019

(65) Prior Publication Data
US 2020/0047426 A1    Feb. 13, 2020

(30) Foreign Application Priority Data
Aug. 8, 2018 (JP) .............................. JP2018-149390

(51) Int. Cl.
*B29C 65/00* (2006.01)
*B32B 7/12* (2006.01)
(Continued)

(52) U.S. Cl.
CPC .............. *B29C 66/71* (2013.01); *B29C 33/02* (2013.01); *B32B 7/12* (2013.01); *B32B 27/08* (2013.01); *B32B 2250/02* (2013.01)

(58) Field of Classification Search
None
See application file for complete search history.

(56) References Cited

U.S. PATENT DOCUMENTS 5,122,430 A * 6/1992 Nishitsuji ................ B41M 3/16
106/31.9

FOREIGN PATENT DOCUMENTS

CN         1906977 A     1/2007
JP       S57-208219 A    12/1982
(Continued)

OTHER PUBLICATIONS

Chinese Office Action, dated Apr. 14, 2021, for Chinese Application No. 201910728219.6, 28 pages (with English translation).

*Primary Examiner* — Christopher T Schatz
(74) *Attorney, Agent, or Firm* — Seed IP Law Group LLP

(57) ABSTRACT

A production method for a shaped object includes preparing a formable resin sheet that includes a base made from a resin, and a thermally expansive layer provided on a first side of the base and containing a thermally expandable material, a thermal conversion layer forming step of forming a thermal conversion layer that contains an electromagnetic wave heat conversion material that converts electromagnetic waves to heat on a first side of the formable resin sheet, an electrically conductive layer forming step of forming an electrically conductive layer on a second side of the formable resin sheet, and an irradiating step of, after forming the thermal conversion layer and the electrically conductive layer, irradiating the thermal conversion layer with the electromagnetic waves to cause the thermal expansive layer to distend and cause the base to deform in accordance with the distension of the thermal expansive layer. The thermal conversion layer and the electrically conductive layer are formed such that at least a portion of the electrically conductive layer is opposite at least a portion of the thermal conversion layer, with the base and the thermally expansive layer interposed therebetween.

11 Claims, 9 Drawing Sheets

(51) Int. Cl.
    *B32B 27/08* (2006.01)
    *B29C 33/02* (2006.01)

(56) References Cited

FOREIGN PATENT DOCUMENTS

| | | |
|---|---|---|
| JP | 62-87826 U | 6/1987 |
| JP | 2-179789 A | 7/1990 |
| JP | H06-8254 A | 1/1994 |
| JP | 2001-232734 A | 8/2001 |
| JP | 2018-089839 A | 6/2018 |

\* cited by examiner

FORM THERMAL CONVERSION LAYER ON FRONT SIDE

FORM ELECTRICALLY CONDUCTIVE LAYER ON BACK SIDE

IRRADIATE WITH ELECTROMAGNETIC WAVES

FORMABLE RESIN SHEET, PRODUCTION METHOD FOR FORMABLE RESIN SHEET, SHAPED OBJECT AND PRODUCTION METHOD FOR SHAPED OBJECT

CROSS-REFERENCE TO RELATED APPLICATION

This application claims the benefit of Japanese Patent Application No. 2018-149390, filed on Aug. 8, 2018, the entire disclosure of which is incorporated by reference herein.

FIELD

The present disclosure relates generally to a formable resin sheet that uses a thermally expandable material that expands according to the amount of heat absorbed, a production method for the formable resin sheet, a shaped object, and a production method for the shaped object.

BACKGROUND

Switches such as membrane switches are used in the related art as inputters. Examples of such inputters include numbers on electronic devices. Resin sheets that have been subjected to embossing, for example, are used for the membrane switches. Additionally, in the embossing, the sheet is molded into a desired shape using a concave mold and a convex mold (see, for example, Unexamined Japanese Patent Application Kokai Publication No. H06-8254).

In such a method, molds that correspond to the desired shape must be prepared before molding the resin sheet. As such, time and cost are required to manufacture the molds, which is a problem.

The present disclosure is made with the view of the above situation, and an objective of the present disclosure is to provide a formable resin sheet that can be easily shaped and a production method of the formable resin sheet, and a shaped object using the formable resin sheet and a production method of the shaped object.

SUMMARY

According to one aspect of the present disclosure, a production method for a shaped object includes preparing a formable resin sheet that includes a base made from a resin, and a thermally expansive layer provided on a first side of the base and containing a thermally expandable material, a thermal conversion layer forming step of forming a thermal conversion layer that contains an electromagnetic wave heat conversion material that converts electromagnetic waves to heat on a first side of the formable resin sheet, an electrically conductive layer forming step of forming an electrically conductive layer on a second side of the formable resin sheet; and an irradiating step of, after forming the thermal conversion layer and the electrically conductive layer, irradiating the thermal conversion layer with the electromagnetic waves to cause the thermal expansive layer to distend and cause the base to deform in accordance with the distension of the thermal expansive layer. The thermal conversion layer and the electrically conductive layer are formed such that at least a portion of the electrically conductive layer is opposite at least a portion of the thermal conversion layer, with the base and the thermally expansive layer interposed therebetween.

According to another aspect of the present disclosure a production method for a shaped object includes preparing a formable resin sheet that includes a base made from a resin, and a thermally expansive layer provided on a first side of the base and containing a thermally expandable material, a thermal conversion layer forming step of forming a thermal conversion layer that contains an electromagnetic wave heat conversion material that converts electromagnetic waves to heat on a first side of the formable resin sheet, an electrically conductive layer forming step of forming an electrically conductive layer that covers at least a portion of the thermal conversion layer, and an irradiating step of, after forming the thermal conversion layer and the electrically conductive layer, irradiating the thermal conversion layer with the electromagnetic waves to cause the thermal expansive layer to distend and cause the base to deform in accordance with the distension of the thermal expansive layer.

According to yet another aspect of the present disclosure, a shaped object includes a base, and a thermally expansive layer provided on a first side of the base and containing a thermally expandable material, a thermal conversion layer containing an electromagnetic wave heat conversion material that converts electromagnetic waves to heat and provided on one of the thermally expansive layer and a second side of the base, and an electrically conductive layer that is electrically conductive and is provided on another one of the thermally expansive layer and the second side of the base. The at least a portion of the electrically conductive layer is provided so as to be opposite at least a portion of the thermal conversion layer, with the base and the thermally expansive layer interposed therebetween, and the thermally expansive layer in a region where the thermal conversion layer is provided rises due to expansion of the thermally expandable material, and the base in the region deforms in a direction in which the thermally expansive layer rises.

According to yet even another aspect of the present disclosure, a formable resin sheet includes a base, and a thermally expansive layer provided on a first side of the base and containing a thermally expandable material, a thermal conversion layer containing an electromagnetic wave heat conversion material that converts electromagnetic waves to heat and provided on one of the thermally expansive layer and a second side of the base, and an electrically conductive layer that is electrically conductive and is provided on another one of the thermally expansive layer and the second side of the base. The at least a portion of the electrically conductive layer provided is so as to be opposite at least a portion of the thermal conversion layer, with the base and the thermally expansive layer interposed therebetween.

According to yet even another aspect of the present disclosure, a production method for a formable resin sheet includes a thermal conversion layer forming step of forming, on one of a (i) thermally expansive layer containing a thermally expandable material formed on one side of the base and (ii) another side of the base, a thermal conversion layer containing an electromagnetic wave heat conversion material that converts electromagnetic waves to heat, an electrically conductive layer forming step of forming an electrically conductive layer on another one of the thermally expansive layer and the second side of the base. The thermal conversion layer and the electrically conductive layer are formed such that at least a portion of the electrically conductive layer is opposite at least a portion of the thermal conversion layer, with the base and the thermally expansive layer interposed therebetween.

BRIEF DESCRIPTION OF THE DRAWINGS

A more complete understanding of this application can be obtained when the following detailed description is considered in conjunction with the following drawings, in which.

DETAILED DESCRIPTION

Hereinafter, the drawings are used to describe, in detail, a shaped object and a production method for the shaped object according to embodiments of the present disclosure.

In this application, the term "shaped object" refers to a formable resin sheet or a base in which shapes such as simple shapes such as convexities (protrusions) and concavities (recesses), geometrical shapes, characters, patterns, and decorations are shaped (formed) on a predetermined side of the formable resin sheet. The term "decorations" refers to objects that appeal to the aesthetic sense through visual and/or tactile sensation. The term "shaping (or forming)" refers to the giving of shape to an object to form a shaped object, and should be construed to also include concepts such as decorating and ornamenting. The shaped object of the present embodiment is a three-dimensional object that includes unevennesses, geometrical shapes, decorations, or the like on a predetermined side. However, to distinguish this three-dimensional object from three-dimensional objects formed using a so-called 3D printer, the shaped object of the present embodiment is called a 2.5-dimensional (2.5D) object or a pseudo-three-dimensional (pseudo-3D) object. Moreover, the technique used to produce the shaped object of the present embodiment is called 2.5D printing or pseudo-3D printing.

In the present description, for ease of description, the side of the formable resin sheet where the thermally expansive layer is provided is referred to as the front side (front surface) or the top surface, and the side of the formable resin sheet where the base is provided is referred to as the back side (back surface) or the bottom side. The terms "front", "back", "top", and "bottom" should not be construed to limit the method of use of the formable resin sheet. That is, depending on the method of use of the shaped resin sheet, the back side of the formable resin sheet can be used as the front side. The same is applicable to the shaped object as well.

Embodiment 1

Formable Resin Sheet 10

Figure 1:
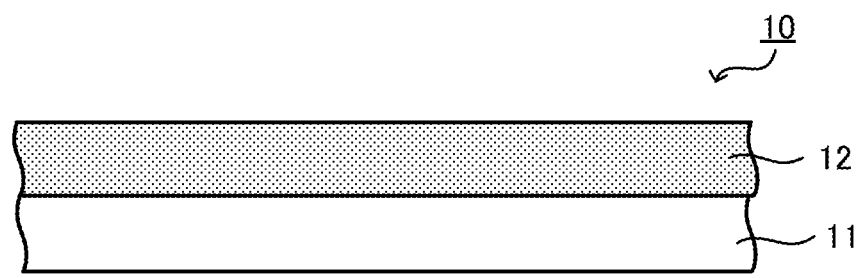
FIG. 1 is a cross-sectional view illustrating a formable resin sheet according to Embodiment 1.
Figure 2:
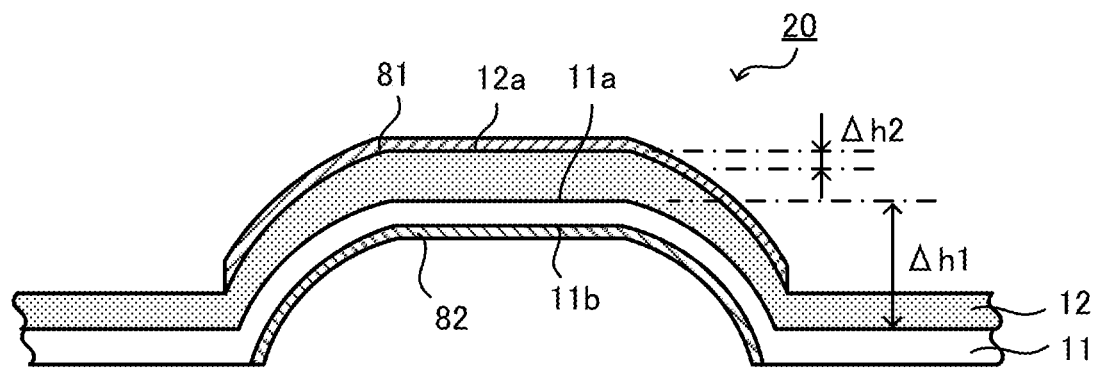
FIG. 2 is a cross-sectional view illustrating a shaped object according to Embodiment 1.

As illustrated in FIG. 1, the formable resin sheet 10 includes a base 11 and a thermally expansive layer 12 formed on a first surface of the base 11. While described in detail later, in the present embodiment, the thermally expansive layer 12 is caused to distend, the base 11 is caused to deform in the direction in which the thermally expansive layer 12 distends, and the shape of the base 11 after deformation is maintained. As a result, the shaped object 20 illustrated in FIG. 2 is formed using the formable resin sheet 10.

The base 11 is implemented as a sheet-like member that supports the thermally expansive layer 12. The thermally expansive layer 12 is provided on a first side (the top surface illustrated in FIG. 1) of the base 11. The base 11 is a sheet that is formed from a thermoplastic resin. While not limited hereto, examples of the thermoplastic resin include polyolefin resins such as polyethylene (PE) and polypropylene (PP), polyethylene terephthalate (PET), polybutylene terephthalate (PBT), polyester resins, polyamide resins such as nylon, polyvinyl chloride (PVC) resins, polyimide resins, and the like.

The base 11 is preferably easily deformable by heat. As such, the material used as the base 11, the thickness of the base 11, and the like may be determined such that the base 11 is easily deformed by heat. In addition, the shape of the base 11 after deformation may preferably be maintained. As such, the material used as the base 11, the thickness of the base 11, and the like may preferably be determined such that the shape of the base 11 after deformation can be maintained. The material, the thickness, and the like of the base 11 are designed so as to be suited to the application of the produced shaped object 20. For example, depending on the application of the shaped object 20, there are cases in which, instead of simply maintaining the deformed shape, the shaped object 20 must have elastic force that allows the shaped object 20 to return to the original shape after having been pressed and deformed. In such a case, for example, the material of the base 11 is determined so as to provide the deformed base 11 with the required elastic force.

The thermally expansive layer 12 is provided on a first side (the top surface in FIG. 1) of the base 11. The thermally expansive layer 12 is a layer that distends to a size that corresponds to the heating process (for example, the heating temperature and heating time), and includes a thermally expandable material (thermally expandable microcapsules, micropowder) dispersed/disposed in a binder. The thermally expansive layer 12 is not limited to including one layer and may include a plurality of layers. Any thermoplastic resin, such as an ethylene-vinyl-acetate polymer or an acrylic polymer, may be used as the binder of the thermally expansive layer 12. The thermally expandable microcapsules contain propane, butane, or a similar low boiling point volatile substance in thermoplastic resin shells. The shells are formed from a thermoplastic resin such as, for example, polystyrene, polyvinyl chloride, polyvinylidene chloride, polyvinyl acetate, polyacrylic acid ester, polyacrylonitrile, polybutadiene, or copolymers thereof. In one example, the average particle size of the thermally expandable microcapsules is about 5 to 50 µm. When these microcapsules are heated to the thermal expansion start temperature or higher, the shells that are made from the resin soften and the low boiling point volatile substance encapsulated therein vaporizes. The pressure resulting from this vaporization causes the shells to expand in a balloon-like manner. While dependent on the characteristics of the microcapsules to be used, the particle size of the microcapsules expands to about five-times larger than that prior to expansion. Note that there is variance in the particle sizes of the microcapsules and all of the microcapsules do not have the same particle size.

Moreover, as described later, in the present embodiment, it is preferable that the thicknesses, the materials, and the like of the base 11 and the thermally expansive layer 12 are configured such that the amount of deformation of the base 11 is greater than the amount of height increase due to foaming of the thermally expansive layer 12. A particular objective of the present embodiment is to cause the base 11 to deform into a desired shape. As such, it is sufficient that the thermally expansive layer 12 has at least a thickness that allows the base 11 to be deformed into the desired shape. Therefore, it is preferable that the thickness of the thermally expansive layer 12 is less than or equal to the thickness of the base 11. Note that the thickness of the thermally expansive layer 12 may by greater than the thickness of the base 11 in cases in which the thermally expansive layer 12 must be formed thicker such as when, for example, the base 11 is a material that does not easily deform or the shape of the shaped object requires the thermally expansive layer 12 to foam higher.

Shaped Object 20

Next, FIG. 2 is used to describe the shaped object 20. The shaped object 20 is a sheet that is obtained by shaping the formable resin sheet 10. Specifically, as illustrated in FIG. 2, the thermally expansive layer 12 distends in the upward direction illustrated in FIG. 2, and a protrusion 12a is provided on the top surface of the thermally expansive layer 12. A protrusion 11a is also provided on the top surface of the base 11, and a recess 11b is provided in the bottom surface of the base 11. The recess 11b has a shape that corresponds to the protrusion 11a. The protrusion 11a of the base 11 and the protrusion 12a of the thermally expansive layer 12 protrude from the surrounding regions. Additionally, an electrically conductive layer 82 that covers the recess 11b of the base 11 is provided. In the shaped object 20, a thermal conversion layer 81 is provided on the protrusion 12a of the thermally expansive layer 12 and the electrically conductive layer 82 is provided on the recess 11b of the base 11. The electrically conductive layer 82 can also be said to be provided on the inner side of the recess 11a.

The thermal conversion layer 81 includes an electromagnetic wave heat conversion material capable of converting electromagnetic waves to heat (hereinafter also referred to as "heat conversion material"). The thermal conversion layer 81 is provided on a region (in FIG. 2, the protrusion 12a) of the thermally expansive layer 12 that is to be caused to rise due to the distending. The thermal conversion layer 81 is formed, by a desired printing device such as an offset printing device or an ink jet printer, on the thermally expansive layer 12 using an ink that contains the electromagnetic wave heat conversion material (foamable ink). One example of the heat conversion material is carbon black (graphite), which is a carbon molecule. In this case, as a result of being irradiated with the electromagnetic waves, the graphite absorbs the electromagnetic waves, thermally vibrates, and generates heat. The thermal conversion layer 81 is heated due to being irradiated with electromagnetic waves and, as such, is also called a "heated layer." Note that the heat conversion material is not limited to graphite, and lanthanum hexaboride (LaB6), cesium tungsten oxide, or another infrared absorbing material can be used. Any one of the inorganic infrared absorbing agents described above may be used alone, or a combination of two or more different materials may be used.

The electrically conductive layer 82 is provided on the recess 11b of the base 11, and includes an electrically conductive material such as an electrically conductive polymer. Thiophene-based electrically conductive polymers can be used as the electrically conductive polymer, and examples thereof include poly(3,4-ethylenedioxythiophene)/poly(4-styrenesulfonic acid) (hereinafter referred to as "PEDOT/PSS"). In one example, the surface resistivity of the electrically conductive layer 82 is 102 to 103 Ω (Ω/sq.). The electrically conductive layer 82 is formed by printing ink that contains PEDOT/PSS. Examples of such electrically conductive ink include Denatron PT801 (manufactured by Nagase ChemteX Corporation).

While described later, in the present embodiment, the thermal conversion layer 81, which is provided on the top surface of the formable resin sheet 10, generates heat as a result of being irradiated with the electromagnetic waves. The heat generated by the thermal conversion layer 81 is transmitted to the thermally expansive layer 12. As a result, the thermally expandable material in the thermally expansive layer 12 foams and, as a result, the thermally expansive layer 12 distends and rises. As such, the regions near the thermal conversion layer 81 can be exclusively and selectively heated, and specific regions of the thermally expansive layer 12 can be exclusively and selectively caused to distend. The heat generated by the thermal conversion layer 81 may also be transmitted to the base 11, thereby causing the base 11 to soften. When the thermally expansive layer 12 foams and distends, the base 11 deforms to a shape that conforms to the distending direction of the thermally expansive layer 12. Specifically, the base 11 deforms in the direction that the thermally expansive layer 12 rises, and maintains that shape after the deformation.

Thus, since the base 11 deforms in the region where the thermal conversion layer 81 is provided to form the protrusion 11a, the electrically conductive layer 82 is provided so as to be opposite the thermal conversion layer 81 with the base 11 and the thermally expansive layer 12 interposed therebetween, as illustrated in FIG. 2. Additionally, as described later, in the present embodiment, the electrically conductive layer 82 is provided in the region where the protrusion 11a (the recess 11b) is to be formed, prior to shaping the formable resin sheet 10. As a result, the electrically conductive layer 82 can be formed satisfactorily on the inner side of the protrusion 11a (on the recess 11b). Note that, the entire electrically conductive layer 82 need not necessarily be opposite the thermal conversion layer 81 as illustrated in FIG. 2. It is sufficient that the electrically conductive layer 82 is opposite at least a portion of the thermal conversion layer 81. Moreover, the electrically conductive layer 82 may also be provided in regions that are not opposite the thermal conversion layer 81. Accordingly, it is sufficient that at least a portion of the electrically conductive layer 82 is opposite at least a portion of the thermal conversion layer 81.

When the protrusion 12a illustrated in FIG. 2 is formed on the thermally expansive layer 12, the distending force of the thermally expansive layer 12 acts in the direction opposite the base 11 (toward the top side illustrated in FIG. 3A). The base 11 deforms as if being pulled in the upward direction illustrated in FIG. 2 by this distending force and the protrusion 11a is formed in the top surface of the base 11. Additionally, the recess 11b that corresponds to the shape of the protrusion 12a, which is formed on the front side, is formed in the back side of the base 11. The shape of the recess 11b is substantially the same as the shape of the protrusion 11a. That is, the recess 11b has a shape that is smaller than the protrusion 11a in relation to the thickness of the base 11. In the present description, although a mold used with conventional embossing is not used, the shapes of the protrusion 12a of the thermally expansive layer 12, and the protrusion 11a and the recess 11b of the base 11 are expressed as embossed shapes. Such shapes are referred to as "embossed shapes" because the shapes after deformation are similar to shapes formed by conventional embossing.

With the shaped object 20 of the present embodiment, since, in particular, the base 11 is deformed using the thermally expansive layer 12, an amount of deformation Δh1 of the base 11 may preferably be greater than a foaming height Δh2 of the thermally expansive layer 12, as illustrated in FIG. 2. Note that the amount of deformation Δh1 is the height of the protrusion 11a measured from the surface of a non-deformed region of the base 11. The foaming height (difference) Δh2 of the thermally expansive layer 12 is obtained by subtracting the height of the thermally expansive layer 12 before distension from the height of the thermally expansive layer 12 after distension. The difference Δh2 can also be described as the amount of increase in height of the thermally expansive layer 12, caused by the expansion of the thermally expandable material.

Switch 30

Next, the drawings are used to describe a switch 30 that uses the shaped object 20 of the present embodiment. The switch 30 of the present embodiment is an example of a product that includes the shaped object 20. In one example, the switch 30 is used as the key top of an electronic device such as a calculator. However, the electronic device is not limited to a calculator and may be a printer, a remote controller, or the like. The function of the switch 30 of the present embodiment may be any desired function.

Figure 3:
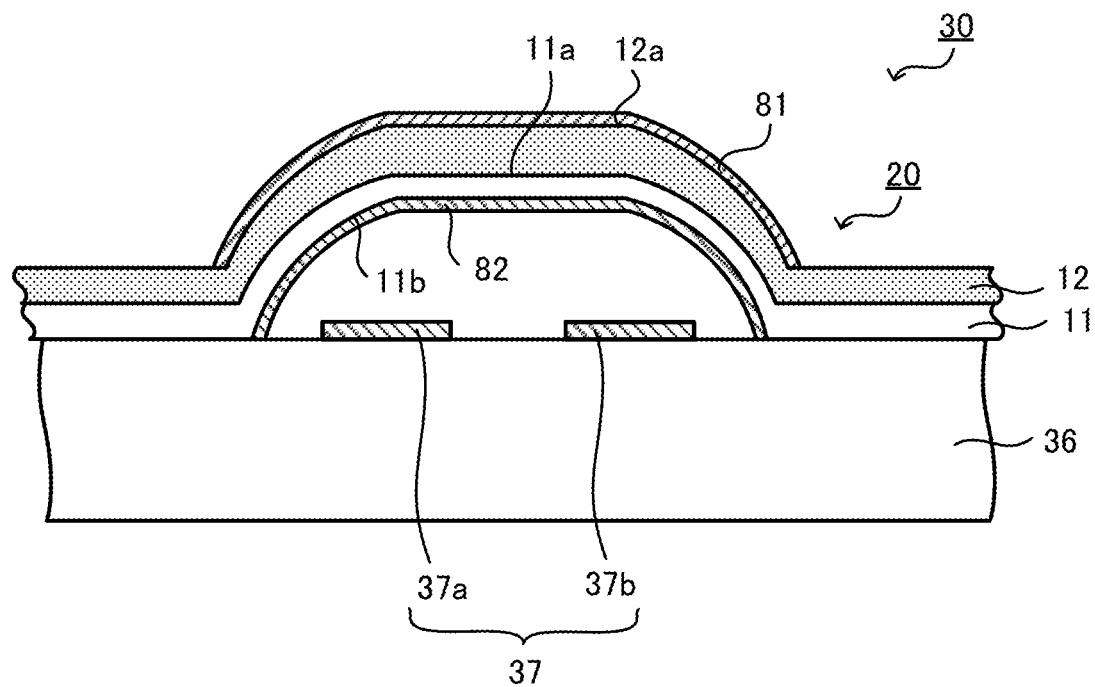
FIG. 3 is a cross-sectional view illustrating a switch that uses the shaped object according to Embodiment 1.

As illustrated in FIG. 3, the switch 30 is a so-called membrane switch. The switch 30 includes a circuit board 36 and a lower contact portion 37 (contact pads 37a, 37b) provided on the circuit board 36. The shaped object 20 is disposed on the circuit board 36. The electrically conductive layer 82 of the shaped object 20 functions as an upper contact portion.

The contact pads 37a, 37b of the lower contact portion 37 are integrally formed, and are formed in the region where the lower contact portion 37 is opposite the electrically conductive layer 82. In a planar view, the contact pads 37a, 37b have a zig-zig shape. The contact pads 37a and 37b are each connected to a wiring (not illustrated in the drawings). In this case, the resistivity of the lower contact portion 37 changes and pressing of the switch 30 is detected as a result of the electrically conductive layer 82, which is the upper contact portion, contacting between the contact pads 37a and 37b.

Note that the contact pads 37a, 37b of the lower contact portion 37 may be disposed separated from each other. In this case, electricity is conducted between the contact pads 37a and 37b and pressing of the switch 30 is detected as a result of the electrically conductive layer 82, which is the upper contact portion, contacting the contact pads 37a and 37b.

With the switch 30, the upper side of the shaped object 20 illustrated in FIG. 3 is pressed downward. Specifically, the protrusion 12a of the base 11 and the like is pressed downward. Due to this force, the shaped object 20 deforms so as to become concave and, as a result, the electrically conductive layer 82 contacts the lower contact portion 37. As a result, the resistivity at the lower contact portion 37 changes and pressing of the switch 30 is detected. When, for example, the switch 30 is used in a calculator, the input of a number or an operator symbol is detected. When the force pressing the shaped object 20 and the like is released, the shaped object 20 returns to the original shape.

Production Method for Shaped Object 20

Next, a method for producing the shaped object 20 using the formable resin sheet 10 (shaped object production processing) will be described. In the following production method for the shaped object, an example is described of a case in which a formable resin sheet 10 wound into a roll-like shape (roll-type) is used, but individual sheets of the formable resin sheet 10 may be used.

First, a desired printing device can be used to form the thermal conversion layer 81 and the electrically conductive layer 82. In one example, the thermal conversion layer 81 is printed using an offset printing device. Additionally, in one example, the electrically conductive layer 82 is formed using a screen printing device. The expansion device 50 illustrated in FIG. 4 can be used to cause the thermally expansive layer 12 to distend.

Figure 4:
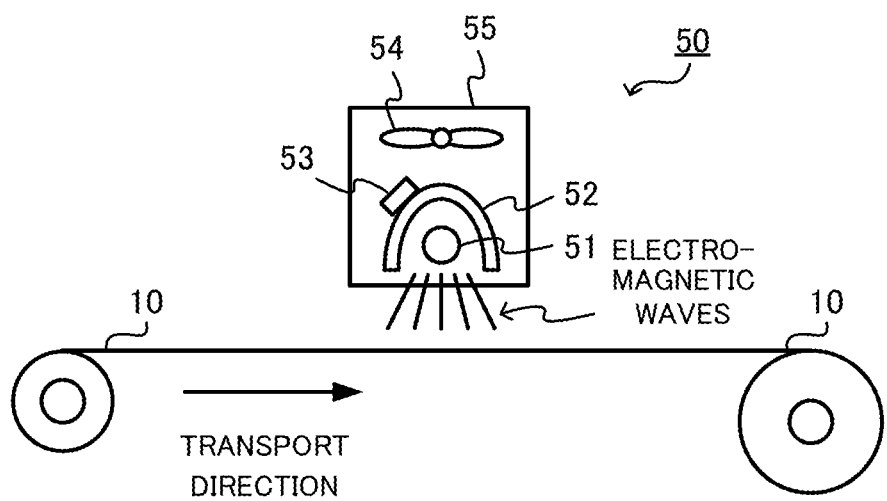
FIG. 4 is a drawing illustrating an overview of an expansion device used in a production method for the shaped object according to Embodiment 1.

As illustrated in FIG. 4, the expansion device 50 includes an irradiator 51, a reflection plate 52, a temperature sensor 53, a cooler 54, and a housing 55. The irradiator 51, the reflection plate 52, the temperature sensor 53, and the cooler 54 are housed in the housing 55. The formable resin sheet 10 is transported under the expansion device 50.

In one example, the irradiator 51 comprises the lamp heater, such as a halogen lamp. The lamp heater emits, at the formable resin sheet 10, electromagnetic waves (light) in the near-infrared region (750 to 1400 nm wavelength range), the visible light spectrum (380 to 750 nm wavelength range), or the intermediate infrared region (1400 to 4000 nm wavelength range). When the formable resin sheet 10, on which the thermal conversion layer 81 formed from the foamable ink that contains the thermal conversion material is printed, is irradiated with electromagnetic waves, the portions where the thermal conversion layer 81 is printed convert the electromagnetic waves to heat more efficiently than the portions where the thermal conversion layer 81 is not printed. As such, the portions of the formable resin sheet 10 where the thermal conversion layer 81 is printed are mainly heated and, when the temperature at which expansion begins is reached, the thermally expandable material expands. Note that the irradiator 51 is not limited to a halogen lamp and other configurations may be used provided that it is possible to emit electromagnetic waves. Moreover, the wavelengths of the electromagnetic waves are not limited to the ranges described above.

The reflection plate 52 is an irradiation target that receives the electromagnetic waves emitted from the irradiator 51, and is a mechanism that reflects the electromagnetic waves emitted from the irradiator 51 toward the formable resin sheet 10. The temperature sensor 53 is a thermocouple, a thermistor or the like, and functions as a measuring device that measures the temperature of the reflection plate 52. The cooler 54 is provided above the reflection plate 52, includes at least one ventilation fan, and functions as a cooling device that cools the interior of the expansion device 50.

In the expansion device 50, the formable resin sheet 10 is pulled from the roll and is subjected to the electromagnetic waves emitted by the irradiator 51 while being transported by transport rollers (not illustrated in the drawings). As a result, the thermal conversion layer 81 provided on the formable resin sheet 10 is heated. This heat is transmitted to the base 11 and the thermally expansive layer 12. At least a portion of the thermally expansive layer 12 distends due to the heat and, as a result, the base 11 deforms. After the distension of the thermally expansive layer 12, the formable resin sheet 10 is wound up. Note that, depending on the amount of deformation of the base 11, the formable resin sheet 10 may be cut instead of being wound up.

Next, an explanation will be given of the flow of processing (shaped object production processing) whereby the formable resin sheet 10 is molded and the shaped object 20 is produced, while referencing the flowchart illustrated in FIG. 5, and the cross-sectional views of the formable resin sheet 10 illustrated in FIGS. 6A to 6C.

First, the formable resin sheet 10 illustrated in FIG. 1 is prepared. Foaming data (data for forming the thermal conversion layer 81) and data for forming the electrically conductive layer 82 are determined in advance. The foaming data indicates the portion of the front side of the formable resin sheet 10 to be foamed and caused to distend. Next, using the offset printing device or the like, the thermal conversion layer 81 is printed on the front side of the formable resin sheet 10 (step S1). The thermal conversion layer 81 is formed using an ink that contains the electromagnetic wave heat conversion material. For example, the thermal conversion layer 81 is formed using carbon black-containing foamable ink. The offset printing device discharges the heat conversion material-containing foamable ink onto the front side of the formable resin sheet 10 in accordance with the designated foaming data. As a result, the thermal conversion layer 81 is formed on the surface (on the thermally expansive layer 12) of the front side of the formable resin sheet 10, as illustrated in FIG. 6A. Note that, when the thermal conversion layer 81 is printed with greater density, the amount of generated heat increases and, as a result, the thermally expansive layer 12 rises higher. Accordingly, a large amount of deformation of the base 11 can be obtained. Thus, the deformation height of can be controlled by controlling the density of the thermal conversion layer 81.

Second, the electrically conductive layer 82 is formed, using the screen printing device or the like, on the surface of the back side of the formable resin sheet 10 using the electrically conductive ink that contains the electrically conductive material (step S2). In this case, an electrically conductive polymer is used as the electrically conductive material. While not limited hereto, an organic thiophene-based electrically conductive polymer such as PEDOT:PSS, for example, is used as the electrically conductive polymer.

Specifically, the electrically conductive ink is printed in a desired pattern on the back side of the base 11 using the screen printing device or the like. Next, the solvent in the ink is volatilized, and the electrically conductive layer 82 is formed. The electrically conductive layer 82 is formed so as to be opposite at least a portion of the thermal conversion layer 81, with the base 11 and the thermally expansive layer 12 interposed therebetween. As a result, the electrically conductive layer 82 is formed as illustrated in FIG. 6B.

Third, the formable resin sheet 10 onto which the thermal conversion layer 81 and the electrically conductive layer 82 are printed is transported to the expansion device 50 such that the front side of the formable resin sheet 10 faces upward. In the expansion device 50, the transported formable resin sheet 10 is irradiated with electromagnetic waves by the irradiator 51 (step S3). Specifically, in the expansion device 50, the irradiator 51 irradiates the front side of the formable resin sheet 10 with electromagnetic waves. The heat conversion material, included in the thermal conversion layer 81 printed on the front side of the formable resin sheet 10, absorbs the irradiated electromagnetic waves, thereby generating heat. The heat generated by the thermal conversion layer 81 is transmitted and transferred to the thermally expansive layer 12, and the thermally expansive material foams and expands. As a result, as illustrated in FIG. 6C, the region of the thermally expansive layer 12 of the formable resin sheet 10 where the thermal conversion layer 81 is printed distends and rises. The base 11 is deformed by being pulled by the distending force of the thermally expansive layer 12. The base 11 retains the shape that results from the deformation.

The shaped object 20 is produced using the formable resin sheet 10 as a result of carrying out the procedures described above.

Note that, the order in which steps S1 and S2 are performed can be changed. However, typically, since electrically conductive ink is expensive, it is preferable that the electrically conductive layer 82 be formed later, as illustrated in FIG. 5.

In the production method for a shaped object that uses the formable resin sheet 10 of the present embodiment, the formable resin sheet 10 can easily be deformed to a desired shape by forming the thermal conversion layer 81 and the electrically conductive layer 82 by printing, and irradiating the thermal conversion layer 81 with the electromagnetic waves. In particular, by using printing and electromagnetic wave irradiation, the need for molds or the like for the shaping is eliminated, and the time and cost required for shaping the formable resin sheet 10 can be reduced. The position where and the height to which the thermally expansive layer 12 is caused to rise can easily be controlled by controlling the density of the thermal conversion layer (the foaming data) 81, controlling the electromagnetic waves (controlling the amount of energy received per unit area), and the like.

Conventionally, it is difficult to provide, by printing, an electrically conductive layer on the inner side of a protrusion (dome) after the protrusion has been formed. However, in the present embodiment, prior to the deformation of the base 11, the electrically conductive layer 82 is provided at a position opposite at least a portion of the thermal conversion layer 81. As such, the electrically conductive layer 82 can easily be provided on the back side of the protrusion 11a (the recess 11b) of the base 11.

The thermally expansive layer 12 positioned on the base 11, which has deformed in a dome shape, distends in order to cause the base 11 to deform. However, this region (the protrusion 12a) has greater elasticity than the other regions and also has cushioning. Accordingly, when, for example, used as the switch 30 illustrated in FIG. 3, cushioning of the protrusion 12a is provided, which is preferable.

Figure 7:
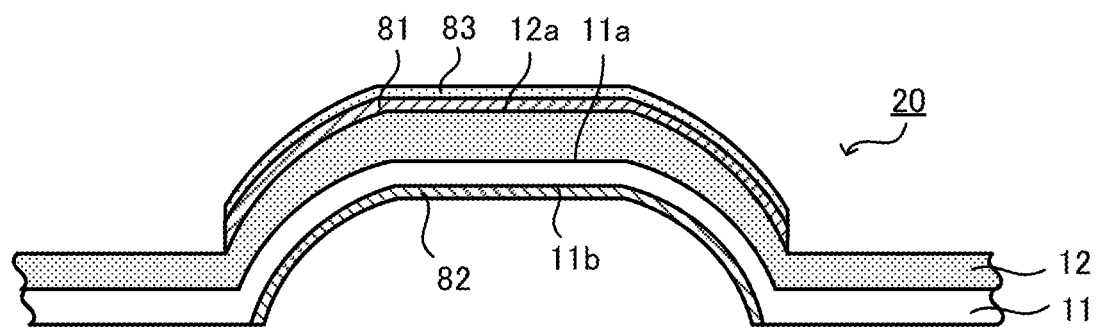
FIG. 7 is a cross-sectional view illustrating a formable resin sheet according to another embodiment.

Note that, in the present embodiment, the shaped object 20 need not be colored. However, as illustrated in FIG. 7, a configuration is possible in which a color ink layer 83 is provided on the thermal conversion layer 81. The color ink layer 83 is formed by printing color ink using a desired printing device. Any ink can be used as the color ink. Examples thereof include water-based inks, solvent-based inks, ultraviolet curable inks, and the like. The color ink layer 83 can express the color of the switch, numbers to be displayed, and the like. Additionally, when forming the color ink layer 83, it is preferable that the color ink layer 83 is formed after step S1 or after step S2 of the shaped object production processing illustrated in FIG. 5.

As illustrated in FIG. 7, the color ink layer 83 is not limited to being formed so as to cover the thermal conversion layer 81. The color ink layer 83 may also be provided in regions where the thermal conversion layer 81 is not formed (for example, around the protrusion 12a). Moreover, the color ink layer 83 can be formed in a desired region of the surface of the front side of the shaped object 20, may be provided only in the region where the thermal conversion layer 81 is not formed, and/or may cover only a portion of the thermal conversion layer 81.

The color ink layer 83 is not limited to being provided on the upper side of the thermal conversion layer 81. Configurations are possible in which the color ink layer 83 is provided on the underside of the thermal conversion layer 81, that is, between the thermally expansive layer 12 and the thermal conversion layer 81. In this case, the color ink layer 83 is formed before step S1 of the shaped object production processing illustrated in FIG. 5.

Embodiment 2

Hereinafter, the drawings are used to describe a formable resin sheet, a production method for the formable resin sheet, and a production method for a shaped object according to Embodiment 2. The formable resin sheet 14 according to the present embodiment differs from the formable resin sheet 10 according to Embodiment 1 in that, with the formable resin sheet 14, the thermal conversion layer 81 and the electrically conductive layer 82 are formed when producing the formable resin sheet 14. Constituents that are the same as those described in Embodiment 1 are marked with the same reference numerals and detailed descriptions thereof are forgone. Additionally, the shaped object of the present embodiment is the same as the shaped object 20 described in Embodiment 1.

Formable Resin Sheet 14

Figure 8:
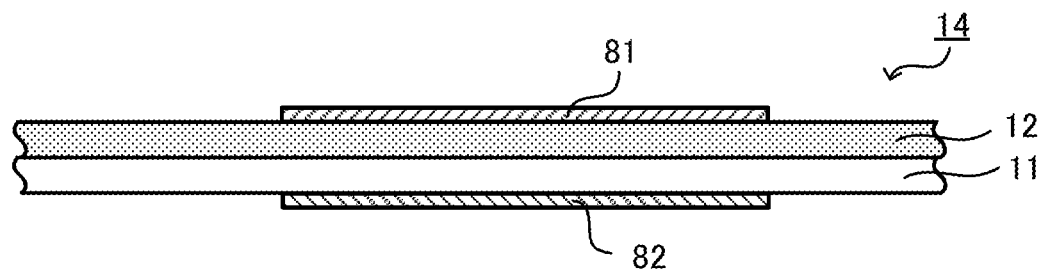
FIG. 8 is a cross-sectional view illustrating a formable resin sheet according to Embodiment 2.

As illustrated in FIG. 8, the formable resin sheet 14 of the present embodiment includes a base 11, a thermally expansive layer 12, a thermal conversion layer 81, and an electrically conductive layer 82. The base 11, the thermally expansive layer 12, the thermal conversion layer 81, and the electrically conductive layer 82 are the same as in Embodiment 1 and, as such, detailed descriptions thereof will be forgone. As in Embodiment 1, at least a portion of the electrically conductive layer 82 is provided so as to be opposite at least a portion of the thermal conversion layer 81, with the base 11 and the thermally expansive layer 12 interposed therebetween.

Production Method for Formable Resin Sheet 14

The formable resin sheet 14 of the present embodiment is produced as described below. First, a sheet-like material such as, for example, polyethylene terephthalate (PET), is prepared as the base 11. The base 11 may be in a roll shape or may be precut.

Figure 9A:
FIGS. 9A to 9C are cross-sectional views illustrating a production method for the formable resin sheet according to Embodiment 2.

Next, the binder including the thermoplastic resin and the like is mixed with the thermally expandable material (the thermally expandable microcapsules) to prepare a coating liquid for forming the thermally expansive layer 12. Then, using a known coating device such as a bar coater, a roll coater, or a spray coater, the coating liquid is applied on the base 11. Note that the thermally expansive layer 12 may be formed using a device other than a coating device. Then, the coated film is dried. Thus, the thermally expansive layer 12 is formed as illustrated in FIG. 9A. Note that the application and the drying of the coating liquid may be carried out a plurality of times in order to obtain the target thickness of the thermally expansive layer 12. Additionally, when using a base 11 that includes the thermally expansive layer 12 on one side, the step of forming the thermally expansive layer 12 may be omitted.

Figure 9B:
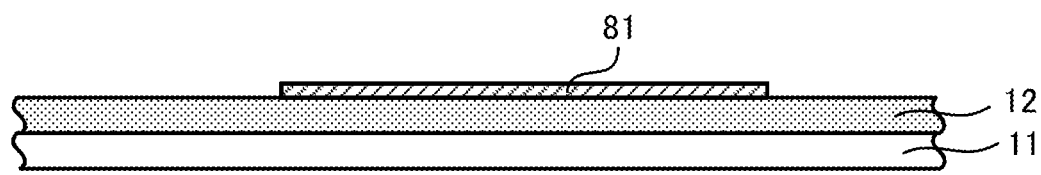

Next, as in Embodiment 1, a desired printing device, such as an offset printing device, is used to print the foamable ink that contains the heat conversion material on the thermally expansive layer 12, thereby forming the thermal conversion layer 81 as illustrated in FIG. 9B.

Figure 9C:
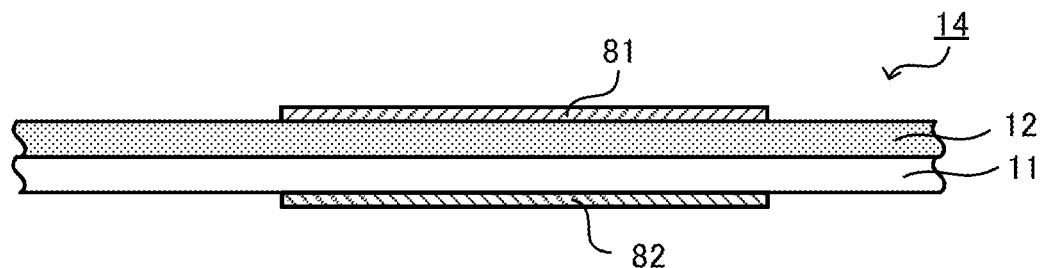

Next, as in Embodiment 1, a desired printing device, such as a screen printing device, is used to print the ink that contains the electrically conductive material on the back side of the base 11, thereby forming the electrically conductive layer 82 as illustrated in FIG. 9C. As in Embodiment 1, the electrically conductive layer 82 is formed so as to be opposite at least a portion of the thermal conversion layer 81, with the base 11 and the thermally expansive layer 12 interposed therebetween. Moreover, in cases in which the base 11 is provided in a roll form, cutting may be performed as desired. Thus, the formable resin sheet 14 is produced.

Figure 5:
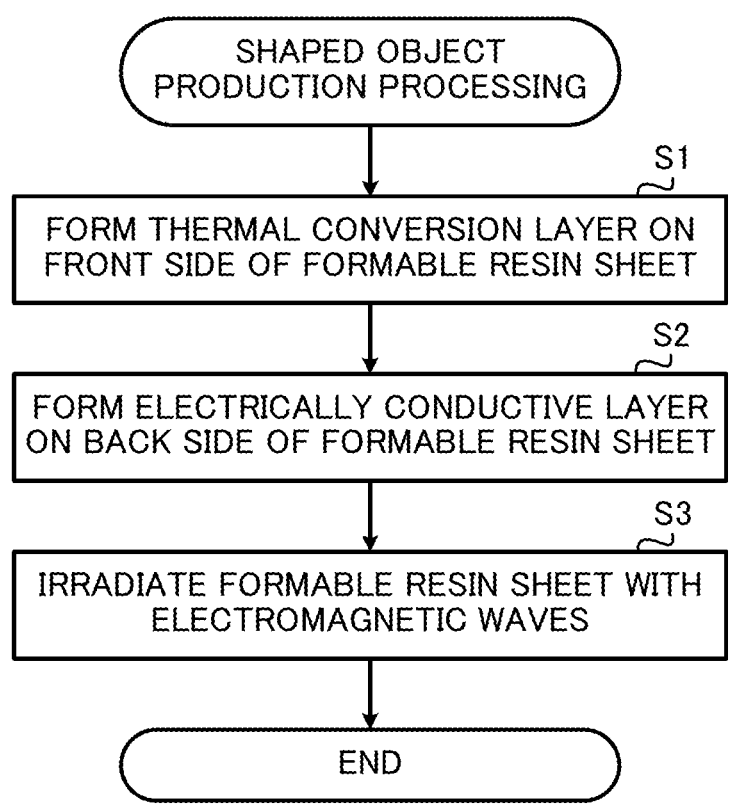
FIG. 5 is a flowchart illustrating the production method for the shaped object according to Embodiment 1.
Figure 6A:
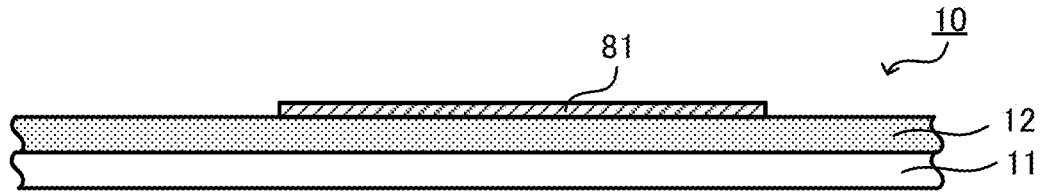
FIGS. 6A to 6C are cross-sectional views schematically illustrating the production method for the shaped object according to Embodiment 1.
Figure 6B:
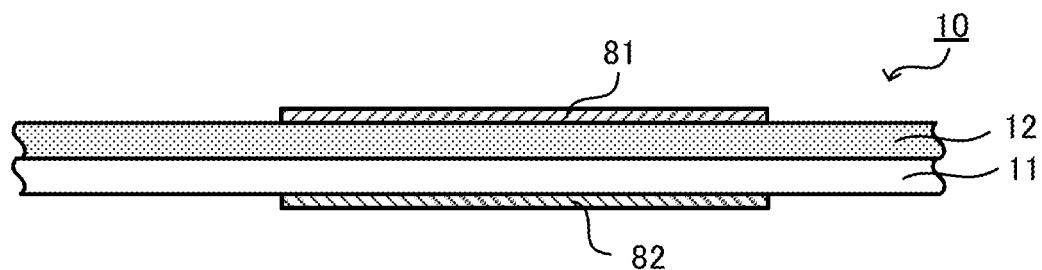
Figure 6C:
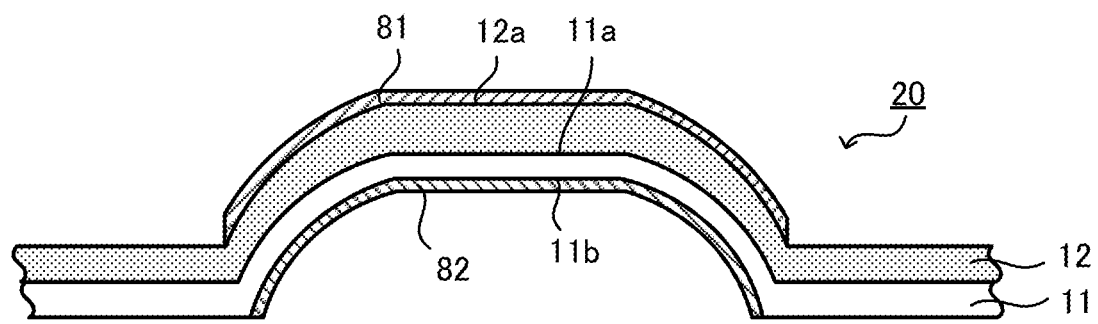

When producing a shaped object using the formable resin sheet 14 of the present embodiment, step S3 of the flowchart illustrated in FIG. 5, used in Embodiment 1, is carried out. Specifically, the formable resin sheet 14 is transported to the expansion device 50 illustrated in FIG. 4, and the formable resin sheet 14 is irradiated with the electromagnetic waves. The thermally expansive layer 12 distends as a result of being irradiated with the electromagnetic waves, and the base 11 deforms in accordance with the distension of the thermally expansive layer 12. Thus, the formable resin sheet 14 can be molded and the shaped object can be formed.

With the formable resin sheet, the production method for the formable resin sheet, and the production method for a shaped object of the present embodiment, the formable resin sheet 14 can easily be deformed to a desired shape by forming the thermal conversion layer 81 and the electrically conductive layer 82 on the formable resin sheet 14 by printing, and irradiating the thermal conversion layer 81 with the electromagnetic waves. In addition, prior to the deformation of the base 11, the electrically conductive layer 82 is provided at a position opposite at least a portion of the thermal conversion layer 81. As such, the electrically conductive layer 82 can easily be provided on the back side of the protrusion 11a (the inner side of the recess 11b) of the base 11.

Embodiment 3

Hereinafter, the drawings are used to describe a formable resin sheet, a shaped object, and a production method for the shaped object according to Embodiment 3. The formable resin sheet 15 according to the present embodiment differs from the formable resin sheet 10 described in Embodiment 1 in that the formable resin sheet 15 includes an intermediate layer 16 between the base 11 and the thermally expansive layer 12, and that the thermally expansive layer 12 can be peeled and removed from the base 11 due to the intermediate layer 16. Detailed descriptions of constituents that are the same as those described in the preceding embodiments are forgone.

Formable Resin Sheet 15

Figure 10:
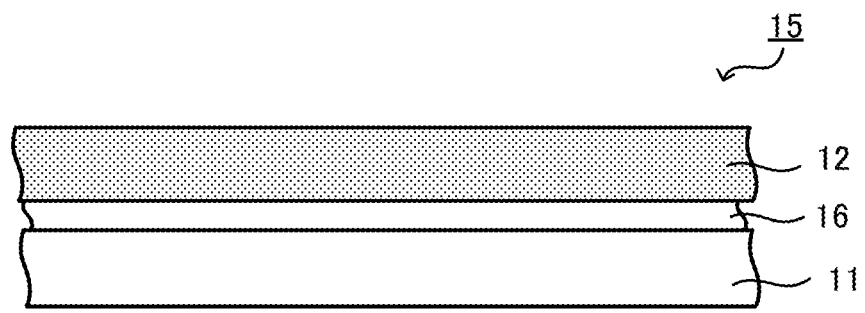
FIG. 10 is a cross-sectional view illustrating a formable resin sheet according to Embodiment 3.

As illustrated in FIG. 10, the formable resin sheet 15 of the present embodiment includes a base 11, an intermediate layer 16, and a thermally expansive layer 12. The base 11 is the same as in Embodiment 1 and, as such, detailed description thereof is forgone.

The intermediate layer 16 is provided on a first side (the top surface illustrated in FIG. 10) of the base 11. The intermediate layer 16 is peelably adhered to the base 11. The thermally expansive layer 12 is provided on the intermediate layer 16. In the present embodiment, the intermediate layer 16 is provided between the base 11 and the thermally expansive layer 12. Furthermore, the peeling strength between the intermediate layer 16 and the base 11 is weaker than the peeling strength between the intermediate layer 16 and the thermally expansive layer 12. As such, the thermally expansive layer 12 can be removed from the base 11 together with the intermediate layer 16.

Note that the peeling strength of the intermediate layer 16 must be such that, at least in the normal range of use, the thermally expansive layer 12 does not peel from the formable resin sheet 15 prior to the distension of the thermally expansive layer 12. Here, the phrase "the normal range of use" is the range of use normally expected for the formable resin sheet 15. Examples thereof include typical actions performed by a user such as carrying the formable resin sheet 15, printing on the formable resin sheet 15, and causing the thermally expansive layer 12 to distend. In addition, it is preferable that the intermediate layer 16 have breaking strength sufficient to prevent internal breakage of the intermediate layer 16 when peeling the thermally expansive layer 12. One example of such an intermediate layer 16 is a resin film that is provided with an adhesive layer on one side. An adhesive that includes a thermosetting resin can be used as the adhesive layer. The adhesive that includes a thermosetting resin is preferably an adhesive that includes vinyl chloride vinyl acetate copolymer resin. The solvent of the adhesive may be water-based or solvent-based. An adhesive that has slight adhesion such as an acrylic adhesive or a silicone adhesive may be used as the adhesive layer. The resin film is produced from a resin selected from, for example, polyester, polyethylene, polyvinyl alcohol, and polyethylene terephthalate, or a copolymer thereof. A film formed from ethylene-vinyl alcohol copolymer, for example, can be used as the intermediate layer 16. The film of the intermediate layer 16 has a thickness of, for example, 12 to 15 and the adhesive layer has a thickness of 2 Provided that the peeling strength of the adhesive layer is 0.06 N/20 mm or greater when measured by a 180° peeling strength test, peeling of the intermediate layer 16 from the base 11 due to typical actions of a user can be substantially prevented Additionally, provided that the peeling strength of the adhesive layer is 0.5 N/20 mm or less and preferably 0.4 N/20 mm or less when measured by a 180° peeling strength test, it is possible to easily peel the intermediate layer 16 from the base 11.

It is sufficient that the peeling strength between the intermediate layer 16 and the base 11 be weaker than the peeling strength between the intermediate layer 16 and the thermally expansive layer 12. For example, the intermediate layer 16 can be formed using a resin selected from a polyvinyl alcohol (PVA) resin, a polyester resin, a polyurethane resin, an acrylic resin, and the like. Examples of such a resin include NS625, manufactured by Takamatsu Oil & Fat Co., Ltd.

The thermally expansive layer 12 is provided on the intermediate layer 16. As in Embodiment 1, the thermally expansive layer 12 is a layer that distends to a size that corresponds to the heating process, and includes a thermally expandable material (thermally expandable microcapsules, micropowder) dispersed/disposed in a binder.

Shaped Object 23

Figure 11A:
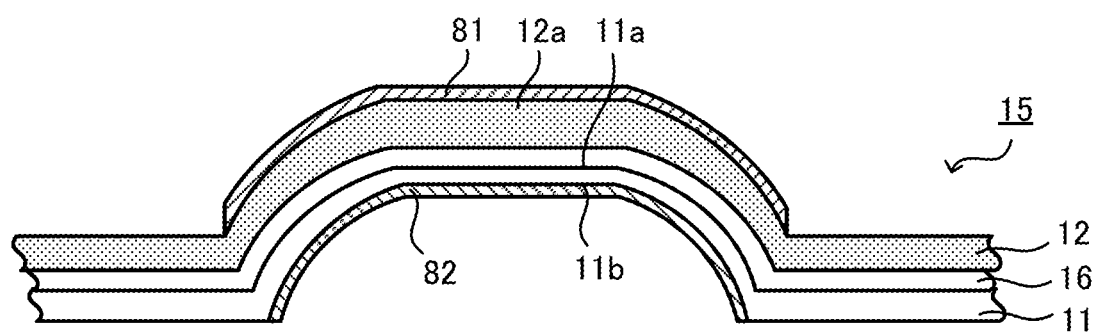
FIG. 11A is a cross-sectional view illustrating the formable resin sheet after a thermally expansive layer is distended.

Next, the drawings are used to describe a shaped object 23 that is produced in the present embodiment. FIG. 11A illustrates the formable resin sheet 15 in a state in which the thermally expansive layer 12 is distended and the base 11 is deformed.

Figure 11B:
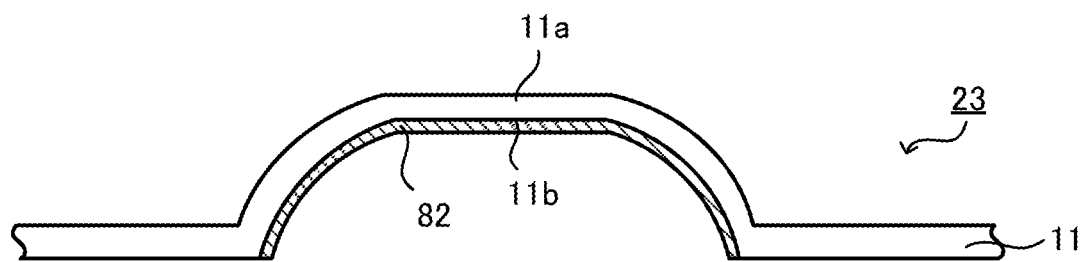
FIG. 11B is a cross-sectional view illustrating a shaped object according to Embodiment 3.

The formable resin sheet 15 in which the thermally expansive layer 12 is distended is the same as the shaped object 20 of Embodiment 1. Specifically, a protrusion 12a is formed on the thermally expansive layer 12, and a protrusion 11a and a recess 11b are formed on the base 11. The protrusion 11a and the protrusion 12a protrude from the surrounding regions. A portion of the intermediate layer 16 at an end of the formable resin sheet 15 illustrated in FIG. 11A is peeled from the base 11. Then, the intermediate layer 16 and the thermally expansive layer 12 provided thereon are pulled and peeled from the base 11. The peeling may be performed manually, or may be performed using a tool, a machine, or the like. As a result, a shaped object 23 formed from the base 11 is obtained. As illustrated in FIG. 11B, the shaped object 23 includes the base 11 in which the protrusion 11a and the recess 11b are provided, and an electrically conductive layer 82 is provided on the recess 11b. In the switch 30 illustrated in FIG. 3, the shaped object 23 of the present embodiment can be used in place of the shaped object 20 of Embodiment 1. In this case, the base 11 may be transparent or translucent.

The shaped object 23 of the present embodiment may further include a color ink layer (not illustrated in the drawings) formed from color ink on one or both sides of the base 11.

Production Method for Shaped Object 23

Figure 12:
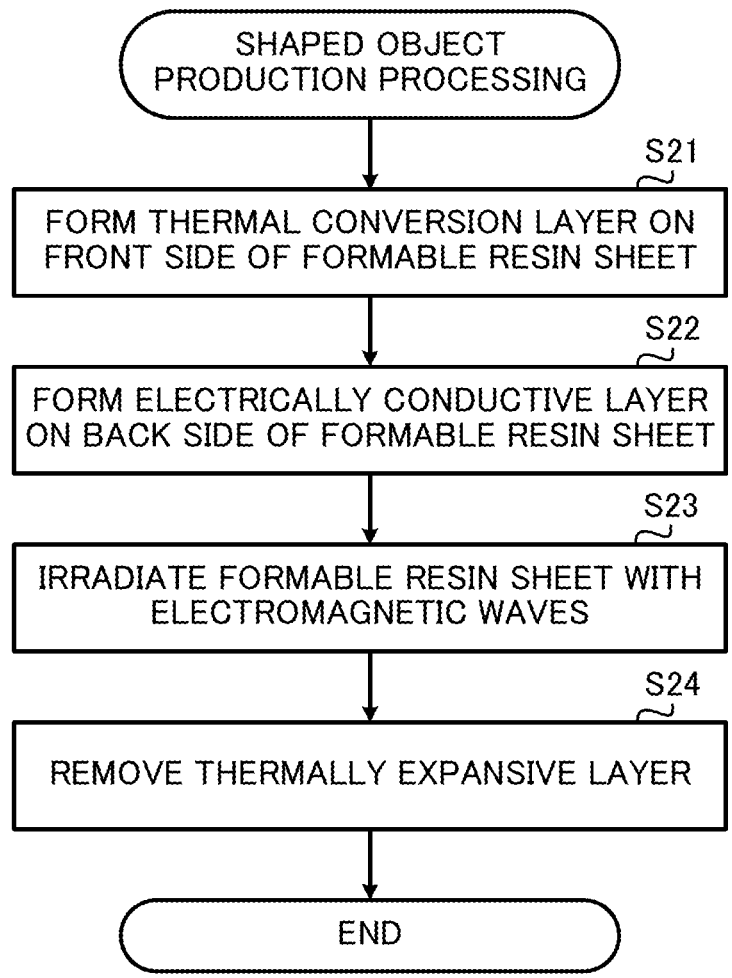
FIG. 12 is a flowchart illustrating a production method for a shaped object according to Embodiment 3.

Next, an explanation will be given of the flow of processing (shaped object production processing) whereby the formable resin sheet 15 is molded and the shaped object 23 is produced, while referencing the flowchart illustrated in FIG. 12, and the cross-sectional views of the formable resin sheet 15 illustrated in FIGS. 13A to 13D.

Figure 13A:
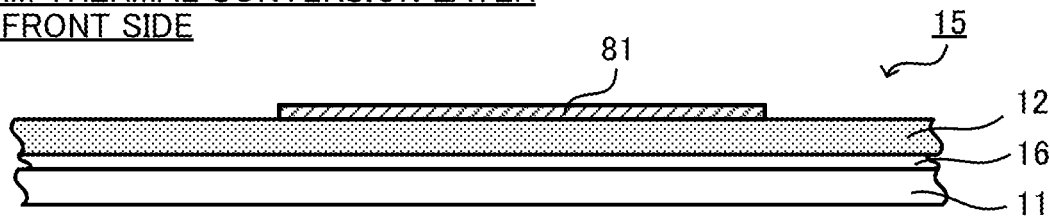
FIGS. 13A to 13D are cross-sectional views schematically illustrating the production method for the shaped object according to Embodiment 3.

First, the formable resin sheet 15 is prepared. In the present embodiment, the thermal conversion layer 81 and the electrically conductive layer 82 are formed in the processing for producing the shaped object 23. As such, the formable resin sheet 15 illustrated in FIG. 15 is prepared. Foaming data (data for forming the thermal conversion layer 81) and data for forming the electrically conductive layer 82 are determined in advance. The foaming data indicates the portion of the front side of the formable resin sheet 15 to be foamed and caused to distend. Next, using foamable ink, the thermal conversion layer 81 is printed on the front side of the formable resin sheet 15 by the offset printing device or the like (step S21). As a result, the thermal conversion layer 81 is formed on the front side of the formable resin sheet 15, as illustrated in FIG. 13A.

Figure 13B:
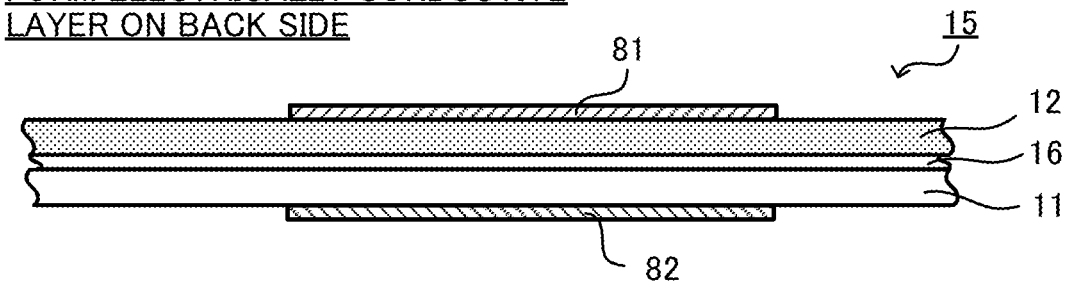

Second, the electrically conductive layer 82 is formed, using the screen printing device or the like, on the surface of the back side of the formable resin sheet 15 using the electrically conductive ink that contains the electrically conductive material (step S22). In this case, an electrically conductive polymer is used as the electrically conductive material. While not limited hereto, PEDOT:PSS is used as the electrically conductive polymer. In the present embodiment, the electrically conductive layer 82 is formed so as to be opposite at least a portion of the thermal conversion layer 81, with the base 11, the intermediate layer 16, and the thermally expansive layer 12 interposed therebetween. As a result, the electrically conductive layer 82 is formed, as illustrated in FIG. 13B.

Figure 13C:
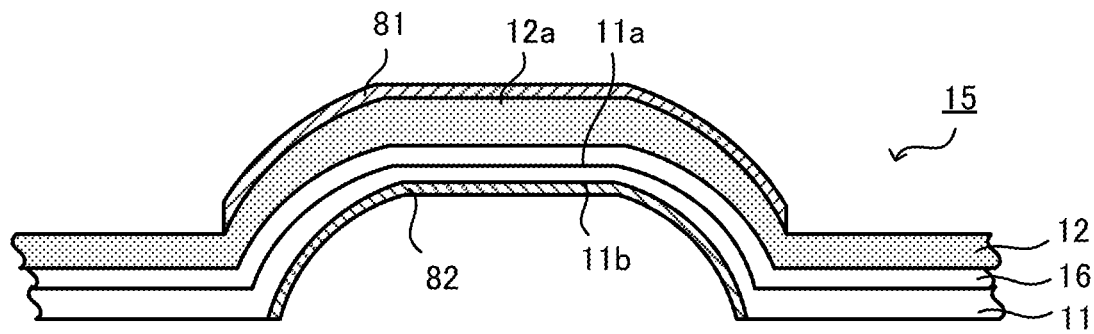

Third, the formable resin sheet 15 onto which the thermal conversion layer 81 and the electrically conductive layer 82 are printed is transported to the expansion device 50 such that the front side of the formable resin sheet 15 faces upward. In the expansion device 50, the transported formable resin sheet 15 is irradiated with electromagnetic waves by the irradiator 51 (step S23). As a result, as illustrated in FIG. 13C, the region of the thermally expansive layer 12 of the formable resin sheet 15 where the thermal conversion layer 81 is printed distends and rises. The base 11 is deformed by being pulled by the distending force of the thermally expansive layer 12.

Figure 13D:
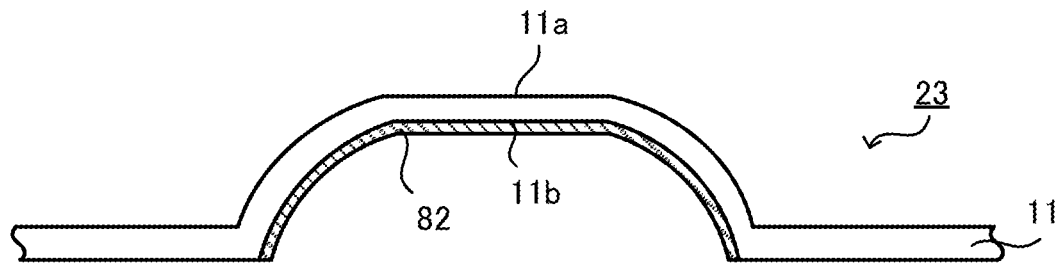

Fourth, a portion of the intermediate layer 16 at an end of the formable resin sheet 15 is peeled from the base 11. Then, the intermediate layer 16 and the thermally expansive layer 12 provided thereon are pulled and peeled from the base 11 (step S24). Thus, the intermediate layer 16 and the thermally expansive layer 12 can be removed from the base 11. The peeling may be performed manually, or may be performed using a tool, a machine, or the like. As a result, as illustrated in FIG. 13D, the intermediate layer 16 and the thermally expansive layer 12 are removed, and a shaped object 23 is produced that includes a molded base 11 and an electrically conductive layer 82 provided covering the recess 11*b* of the base 11.

Note that it is not necessary to peel all of the intermediate layer 16 from the base 11 and it is possible to peel and remove a portion of the intermediate layer 16.

With the formable resin sheet, the shaped object, and the production method for the shaped object of the present embodiment, the formable resin sheet 15 can easily be deformed to a desired shape by forming the thermal conversion layer 81 and the electrically conductive layer 82 on the formable resin sheet 15, and irradiating the thermal conversion layer 81 with the electromagnetic waves. In addition, prior to the deformation of the base 11, the electrically conductive layer 82 is provided at a position opposite at least a portion of the thermal conversion layer 81. As such, the electrically conductive layer 82 can easily be provided on the back side of the protrusion 11*a* (the recess 11*b*) of the base 11.

Furthermore, in the present embodiment, the formable resin sheet 15 includes the intermediate layer 16 and, as such, the thermally expansive layer 12 can be peeled and removed.

In Embodiment 3, as in Embodiment 2, the thermal conversion layer 81 and the electrically conductive layer 82 can be formed at the time of production of the formable resin sheet. In such a case, the formable resin sheet 15 includes the base 11, the intermediate layer 16, the thermally expansive layer 12, the thermal conversion layer 81, and the electrically conductive layer 82.

When producing the formable resin sheet described above, the method includes a step of forming the intermediate layer 16 prior to the step of producing the thermally expansive layer 12 described in Embodiment 2. Specifically, the adhesive layer of the film that includes the adhesive layer on one side is brought into contact with the base 11 and is adhered to the base 11 by thermocompression bonding. It is preferable that a thermosetting adhesive such as vinyl chloride vinyl acetate copolymer resin is used as the adhesive layer. Additionally, an adhesive that has slight adhesion such as an acrylic adhesive or a silicone adhesive may be used as the adhesive layer. Thus, the intermediate layer 16 is provided on the base 11. Next, the thermally expansive layer 12 is formed on the intermediate layer 16 by the same method described in Embodiment 2. The subsequent steps are the same as in Embodiment 2. Additionally, when producing the shaped object, step S23 and step S24 of the flowchart illustrated in FIG. 12 are carried out.

When removing the thermally expansive layer 12 such as in the present embodiment, a configuration is possible in which the formable resin sheet 15 includes the base 11 and thermally expansive layer 12, but does not include the intermediate layer 16. In such a case, since the thermally expansive layer 12 is pulled and peeled from the base 11, it is preferable that the thermally expansive layer 12 includes a binder made from a thermoplastic elastomer that makes the thermally expansive layer 12 less likely to break. While not limited hereto, the thermoplastic elastomer is selected from polyvinyl chloride, ethylene propylene rubber (EPR), ethylene-vinyl acetate copolymer (EVA), styrene thermoplastic elastomers, olefin thermoplastic elastomers, urethane thermoplastic elastomers, polyester thermoplastic elastomers, and the like. A styrene thermoplastic elastomer is preferably used as the binder.

In particular, in the present embodiment, it is required that the thermally expansive layer 12 does not break when peeling. Additionally, if the thermally expansive layer 12 peels from the base 11 when the thermally expansive layer is caused to distend, it will be difficult to form a desired unevenness on the front surface of the thermally expansive layer 12. Therefore, adhesive strength must be provided between the thermally expansive layer 12 and the base 11 that is sufficient to prevent peeling when peeling the thermally expansive layer 12. In addition, the breaking strength of the thermally expansive layer 12 is greater than the peeling strength between the thermally expansive layer 12 and the base 11, and it is preferable that the breaking strength is at least two-times greater than the peeling strength.

This application is not limited to the embodiments described above and various modifications and uses are possible. For example, in Embodiments 1 and 2 described above, an example of a case is described in which the electrically conductive layer 82 is provided on the back side of the protrusion 11*a* (the inner side of the recess 11*b*) of the base 11. However, a configuration is possible in which the electrically conductive layer 82 is provided on the protrusion 12*a* of the thermally expansive layer 12, and the thermal conversion layer 81 is provided on the back side of the protrusion 11*a* (the recess 11*b*) of the base 11. In such a case, in terms of FIG. 2, the electrically conductive layer 82 is provided in the portion where the thermal conversion layer 81 is formed, and the thermal conversion layer 81 is provided in the portion where the electrically conductive layer 82 is formed. Moreover, in such a case, when forming the thermal conversion layer 81 in step S1 illustrated in FIG. 5, the thermal conversion layer 81 is provided on the bottom surface of the base 11 and, in step S2, the electrically conductive layer 82 is formed on the thermally expansive layer 12, which is different from FIG. 6A. Moreover, as in Embodiments 1 and 2, at least a portion of the electrically conductive layer 82 is opposite at least a portion of the thermal conversion layer 81, with the base 11 and the thermally expansive layer 12 interposed therebetween.

The thermal conversion layer 81 and the electrically conductive layer 82 can be formed on the same side of the formable resin sheet. In such a case, at least a portion of the electrically conductive layer 82 is provided so as to cover a portion of the thermal conversion layer 81. Since the electrically conductive layer 82 must contact an external contact point, the thermal conversion layer 81 is provided on the base 11 side, and the electrically conductive layer 82 is disposed so as to cover at least a portion of the thermal conversion layer 81. In terms of FIG. 2, when the thermal conversion layer 81 and the electrically conductive layer 82 are provided on the back side of the formable resin sheet 10 (the surface of the underside illustrated in FIG. 2), the thermal conversion layer 81 is provided between the base 11 and the electrically conductive layer 82. Moreover, in such a case, when forming the thermal conversion layer 81 in step S1 illustrated in FIG. 5, the thermal conversion layer 81 is provided on the bottom surface of the base 11 and, when forming the electrically conductive layer 82 in step S2, the electrically conductive layer 82 is formed so as to cover at least a portion of the thermal conversion layer 81, which is different from FIG. 6A. The same is applicable to Embodiment 2 as well.

Likewise, when the thermal conversion layer 81 and the electrically conductive layer 82 are provided on the front side of the formable resin sheet 10 (the surface of the upper side illustrated in FIG. 2), the electrically conductive layer 82 is provided on the thermal conversion layer 81. In such a case, when forming thermal conversion layer 81 in step S1 illustrated in FIG. 5 and, thereafter, forming the electrically conductive layer 82 in step S2, the electrically conductive layer 82 is formed so as to cover at least a portion of the thermal conversion layer 81. The same is applicable to Embodiment 2 as well.

In the case of Embodiment 3, the thermally expansive layer 12 is removed after the distending and, as such, the thermal conversion layer 81 and the electrically conductive layer 82 are provided on the bottom surface of the formable resin sheet 15. Specifically, the thermal conversion layer 81 is formed between the electrically conductive layer 82 and the base 11 illustrated in FIG. 11A. Moreover, when forming the thermal conversion layer 81 in step S21 illustrated in FIG. 12, the thermal conversion layer 81 is provided on the bottom surface of the base 11 and, in step S22, the electrically conductive layer 82 is formed so as to cover at least a portion of the thermal conversion layer 81, which is different from FIG. 13A.

Additionally, a configuration is possible layer for increasing the adhesion between the base 11 and the thermally expansive layer 12 is formed between the base 11 and the thermally expansive layer 12. Moreover, layers deemed necessary according to the printing method may be formed. For example, when ink jet printing is used, a layer for improving the fixing of the ink may also be provided.

The drawings used in the various embodiments are provided for the purpose of explaining the various embodiments. Accordingly, the thicknesses of the various layers of the formable resin sheet should not be construed as being limited to the ratios illustrated in the drawings.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A production method for a shaped object, the method comprising:

preparing a formable resin sheet that comprises a base made from a resin, and a thermally expansive layer provided on a first side of the base and containing a thermally expandable material;

a thermal conversion layer forming step of forming a thermal conversion layer that contains an electromagnetic wave heat conversion material that converts electromagnetic waves to heat on a first side of the formable resin sheet;

an electrically conductive layer forming step of forming an electrically conductive layer on a second side of the formable resin sheet; and an irradiating step of, after forming the thermal conversion layer and the electrically conductive layer, irradiating the thermal conversion layer with the electromagnetic waves to cause the thermal expansive layer to distend and cause the base to deform in accordance with the distension of the thermal expansive layer, wherein the thermal conversion layer and the electrically conductive layer are formed such that at least a portion of the electrically conductive layer is opposite at least a portion of the thermal conversion layer, with the base and the thermally expansive layer interposed therebetween.

2. The production method for the shaped object according to claim 1, wherein in the electrically conductive layer forming step, the electrically conductive layer is formed by printing an ink that contains an organic thiophene-based electrically conductive polymer as an electrically conductive material.

3. The production method for the shaped object according to claim 1, wherein the electrically conductive layer forming step is performed after the thermal conversion layer forming step.

4. The production method for the shaped object according to claim 1, wherein the electrically conductive layer is provided on a second side of the base, and the thermal conversion layer is provided on the thermally expansive layer, and at least a portion of the thermally expansive layer is removable from the base by peeling an intermediate layer provided between the base and the thermally expansive layer or by peeling the thermally expansive layer itself;

the method further comprising:

after the irradiating step, a thermally expansive layer removing step of removing the thermally expansive layer from the base.

5. The production method for the shaped object according to claim 4, wherein a thickness of the intermediate layer is from 12 to 15 μm, an adhesive layer is provided on a first side of the intermediate layer, and a thickness of the adhesive layer is 2 μm.

6. The production method for the shaped object according to claim 5, wherein a peeling strength of the adhesive layer is from 0.06 N/20 mm to 0.5 N/20 mm.

7. The production method for the shaped object according to claim 5, wherein the intermediate layer is a film made from a resin, and the adhesive layer contains a thermosetting resin.

8. The production method for the shaped object according to claim 5, further comprising:
   a color printing step of printing a color image onto the thermally expansive layer.

9. The production method for the shaped object according to claim 1, wherein
   the base comprises a thermoplastic resin, and
   a thickness of the thermally expansive layer is less than or equal to a thickness of the base.

10. The production method for the shaped object according to claim 1, wherein in the irradiating step, an amount of deformation of the base is greater than a distension height of the thermally expansive layer.

11. A production method for a shaped object, the method comprising:
   preparing a formable resin sheet that comprises a base made from a resin, and a thermally expansive layer provided on a first side of the base and containing a thermally expandable material;
   a thermal conversion layer forming step of forming a thermal conversion layer that contains an electromagnetic wave heat conversion material that converts electromagnetic waves to heat on a first side of the formable resin sheet;
   an electrically conductive layer forming step of forming an electrically conductive layer that covers at least a portion of the thermal conversion layer; and
   an irradiating step of, after forming the thermal conversion layer and the electrically conductive layer, irradiating the thermal conversion layer with the electromagnetic waves to cause the thermal expansive layer to distend and cause the base to deform in accordance with the distension of the thermal expansive layer.

* * * * *